INVENTOR

George Mittelstaedt

United States Patent Office 3,521,058
Patented July 21, 1970

3,521,058
METHOD OF IMPROVING THE DEFINITION OF DETAIL OF BOTH HARD AND SOFT SUBSTANCE IN RADIOGRAPHS
Georg S. Mittelstaedt, 274 73rd St., Brooklyn, N.Y. 11209
Filed Sept. 8, 1965, Ser. No. 485,738
Int. Cl. G03b 41/16
U.S. Cl. 250—65
3 Claims This invention relates to photography and radiography, and relates particularly to radiographic analytic screens and to methods of making them. It relates to means and methods to improve the definition of detail and to define in a single exposure, on a single film, the density variations in relatively hard and soft substances.

The main object of this invention is to provide an analytic screen having alternate areas of respectively unequal permeability by penetrating radiation, for producing radiographs in which relatively hard substance and soft tissue are defined.

The above and other objects will become apparent in the description below, in which characters of reference refer to like-named parts in the drawing.

It is well known in radiography that high-intensity penetrating rays (hard rays) will clearly define the density variations in relatively hard substance e.g. bones, but soft tissue e.g. flesh, will show dark and vague; it is also well known that low-intensity penetrating radiation (soft rays) will clearly define the density variations in soft tissue, but here hard substance will show light and vague.

Accordingly, in this invention, a photographic analytic screen is made comprising alternate penetrating ray absorbent and ray transparent dots of equal size but unequal permeability by penetrating radiation. The ray absorbent dots reduce the intensities of the penetrating rays, but the ray transparent dots leave the ray intensities practically unchanged. Therefore, an intensity variation pattern is produced by the dots, consisting of alternate higher and lower intensities of penetrating rays, as varied by the analytic dotted screen.

The analytic screen is effectively placed in front of the sensitive X-ray film, in contact therewith, and this analytic screen-film arrangement is subjected to penetrating rays from a suitable source through an object.

By "alternate" is meant taking place by turns, first one and then the other; by "dot" is meant small square, spot, speck, fleck, point, particle, very small area, very small part of the surface, hole, perforation etc.; by "X-ray film" is also meant any photographic film.

In a specific method of making, a surface is marked off in alternate squares of black and white, of equal size and contiguous to each other, that is, checkerboard-like side by side without superposition, and the patterned surface is photographed on ray sensitive silver halide film, reducing the size of the image photographically. The white squares will make a strong latent image on the ray sensitive film, but the black square will make no image, or a very weak image. By "black and white" is also meant other unequal shades or unequal colors.

The exposed film is developed, resulting in a radiographic analytic screen of alternate ray absorbent silver squares and ray transparent de-silvered squares, the analytic screen being adapted to define both hard substance and soft tissue, as more fully described and claimed below.

The terms "ray transparent" and "ray absorbent" are meant in relation to each other.

The developing process includes all necessary steps, and may include fixing, stop bath, washing, drying and perhaps intensification, reduction etc.

The developer converts the exposed halide to silver, and/or may deposit silver on the latent image. The salts that were struck by light are changed by the developer into metallic silver, in proportion to exposure. The stop bath removes the chemicals of the developing bath. The fixing bath dissolves the unexposed salts so that they can be removed, and often toughens the film; washing the film removes the dissolved unexposed areas more completely, and also removes the chemicals of the fixing bath.

It may be that traces of silver will remain in the unexposed areas after fixing, and in the text and claims, by "silverless" or "delivered" is also meant having less silver than the exposed area.

Intensification refers to methods for increasing the density of an image usually by the deposition of silver, mercury, or other compound.

Photographic emulsions usually comprise silver halide crystals dispersed in a colloid medium as gelatin, collodion, albumen, casein, agar or cellulose esters. The silver halides employed in the emulsions are, the chloride, the bromide and the iodide, or mixtures thereof. But silver halides are only examples of light sensitive materials. Any other ray sensitive material may be used e.g. light sensitive ferric salt, diazonium and ammonium bichromate, and by silver halides is also meant photohalides. Therefore, in the text and claims, by "silver" is also meant any other photographic material of high atomic weight relative to the support material. The support may be a film, sheet or plate made of glass, cellulose, plastic, paper, relatively light metal, or any other suitable material.

The drawing illustrates the analytic radiographic screens, but the invention is not limited to the particular examples illustrated.

Referring briefly to the drawing, FIG. 1 is a greatly enlarged fractional view of a radiographic analytic screen, illustrating an embodiment of the invention. This figure shows alternate penetrating ray transparent and ray absorbent dots.

Figure 1:
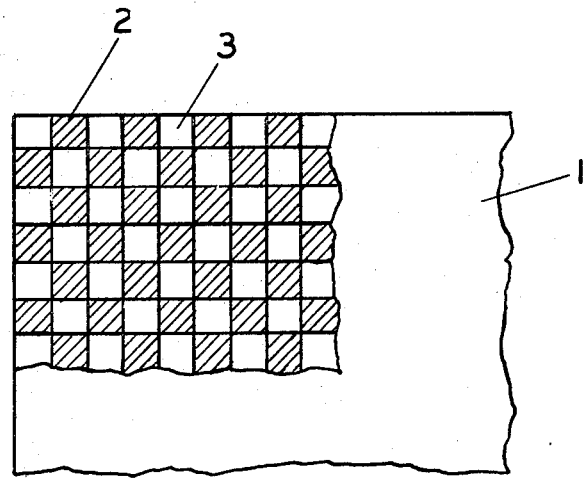

Referring to FIG. 1 of the drawing in greater detail, this figure illustrates an exposed and developed photographic analytic screen, in which the numeral 1 indicates the support, 2 indicates the silver bearing dots, and 3 indicates the de-silvered dots. The unexposed, desilvered dots 3 are substantially transparent to penetrating rays while the exposed, silver bearing dots 2 permit passage of the rays in proportion to their density. That is, the penetrating rays will pass through the desilvered dots 3 practically unchecked, but the silver dots 2 will reduce the intensities of the penetrating rays, resulting in a penetrating ray pattern of alternate high and low intensities, for defining hard substance and soft tissue respectively.

The silver bearing dots 2 and the silverless dots 3 alternate; they are of equal size, contiguous and are disposed side by side without superposition. In the aggregate, the silver bearing dots 2 occupy half of the analytic screen, the silverless dots 3 occupying the other half. It must be understood that by "dot" is also meant small square or any area.

The described analytic screen is placed on the ray entering side of a sensitive X-ray film, in firm contact therewith, to obtain clear and accurate definition of detail. Regularly purocessed analytic film is level and smooth, without any high points or low points, and therefore all areas of the analytic film will make contact with the X- ray film to obtain a clearly defined analytic radiograph.

The silver content and permeability of the silver bearing image dots is largely in proportion to exposure.

In this invention, the photographic analytic image can also be made and developed in any other way than described, as long as it results in alternate small areas of respectively unequal permeability to penetrating radiation. The invention also includes the use of photocopying and of making photographic prints, and includes related methods, to result in the described analytic screen.

In photography, the size of the analytic pattern can be reduced at will, and the reduction can be sufficient to make the dots appear as one continuous image. The photographic emulsions can have a very fine grain, and the resolving power values may range from less than 50 to over 1000 lines/mm. More than 300 lines/mm. cannot be separated visually, but they can be separated photographically.

In this invention, the dot image may be reduced at will, even down to micro dots, and in spite of the smallness of the dots, the ray transparent desilvered dots and the ray absorbent silver dots are disposed alternately with such precision that a transparent dot is always between two absorbent dots, and that a ray absorbent dot is always between two ray transparent dots. The dots are disposed side by side without superposition, and the two dot species are of equal size. Collectively, one species occupies as much space as the other, resulting in a mosaic pattern in which hard substance and soft tissue are defined in equal proportions.

The precise and accurate alternation of the two dot species of respectively unequal permeability by penetrating radiation is a very important feature of this invention.

In the text and claims, by "film" is also meant sheet, plate, layer surface; by "plate" is also meant film; by "photographic film" is also meant any ray sensitive sheet, plate, layer, surface, material including fluorescent screens and other viewing screens; by "light" is meant visible and/or invisible radiation; by "exposed" and "unexposed" is also meant relative to each other; by "transparent," "absorbent" and "opaque" is meant any suitable degree thereof.

The present method depends for its success upon the difference in the density between the support and the image dots carried thereby. It actually depends upon the difference in permeability by the penetrating rays which are employed for producing the radiographic image.

Ordinary photographic film and ordinary development result in good analytic screens; but any methods known may be used to increase the difference in permeability between the support and the image dots.

For instance, the silver images can be treated by any of the intensifying or toning methods known. In these toning methods the silver of the image is usually at least partly replaced by an equivalent amount of metal of higher atomic weight, such as gold or platinum, for example. This replacement results in a greater difference of permeability for the penetrating rays.

Good results are also obtained by converting the silver images into lead, mercury or uranium images. This can be done by the use of solutions of the nitrates of these metals. The metal substituted for the silver should be of higher atomic weight.

Ray sensitive metal plates of the tin-type may be used in this invention, the plate being of a lower atomic weight than the silver image dots, and the light-metal plate carrying the image dots may be flash-coated by the electrolytic process to increase the difference of permeability between the support plate and the dot images carried thereby.

The surface of the plate may also be etched, using a solution which has a preferential solubility for the material of the support plate.

Negatives consisting of metallic compounds such as lead sulfide, lead chloride, lead sulfate etc. may also be employed.

In a specific embodiment of the present invention, I exposed sensitive photographic film in a camera to a black and white checkerboard surface, greatly reducing the size of the image. The film was developed by usual methods resulting in a developed film having very small alternate silver and silverless squares. This film represented a radiographic analytic screen, and this screen was placed directly in front of a sensitive X-ray film, in firm contact therewith. This arrangement was exposed to penetrating rays through an object. The exposed X-ray film was developed and was found to define the density variations in hard substance and soft tissue. When viewed from a normal distance, the tiny squares merged into a continuous image.

The analytic screen can be made with ordinary ray sensitive photographic film, upon sensitized paper, upon ray sensitive metal, or other ray sensitive material. It is not essential to intensify the silver dots by any of the methods outlined above, since silver image dots form satisfactory analytic screens without alteration. Developing, fixing etc. of the images employed in my invention may be according to the usual practices in photography.

Image reversal development may be used, as is known in the art.

It is especially to be noted that all silver bearing dots of the radiographic analytic screen have equal exposure value.

This invention includes any photographic method resulting in an analytic screen. By "analytic" is meant a regular pattern of alternate penetrating ray transparent and ray absorbent areas, as illustrated and described.

The invention may involve the preparation from an analytic negative or from any other film with the described analytic pattern of a special photographic plate with alternate penetrating ray transparent and absorbent areas e.g. a collotype plate or relief plate, the techniques being well known, and a silver suspension ink or other material of relatively high atomic weight may be used to print the analytic pattern from the special photographic plate onto a suitable support of relative penetrating ray transparency, to form a radiographic analytic screen.

In a modification, a photographic print is made from an analytic negative or from any other film with the described analytic pattern on a sensitized sheet of carbon tissue or other transparent material coated with sensitized material which is soluble until it is exposed to light. After exposure to light through said analytic negative, the carbon tissue is developed in a suitable solvent, perhaps warm water, to dissolve out the unexposed portions of the material. The resulting stencil comprises a pattern of alternate solid areas and apertures, corresponding to the analytic pattern of the matrix. The apertures are penetrating ray transparent and the solid areas are ray absorbent. The stencil may serve as analytic screen and may be placed directly in front of and in contact with a sensitive X-ray film; or a silver suspension ink or other material of relatively high atomic weight may be applied through the apertures of the stencil, perhaps also through a silk screen, onto a suitable support sheet of relative ray transparency, to form a radiographic analytic screen.

All this forms part of this invention.

In these modifications, and in all cases, the initial image could be developed to a positive instead of a negative, and in the text and claims, the terms "negative" and "positive" are also meant to be interchangeable.

Figure 2:
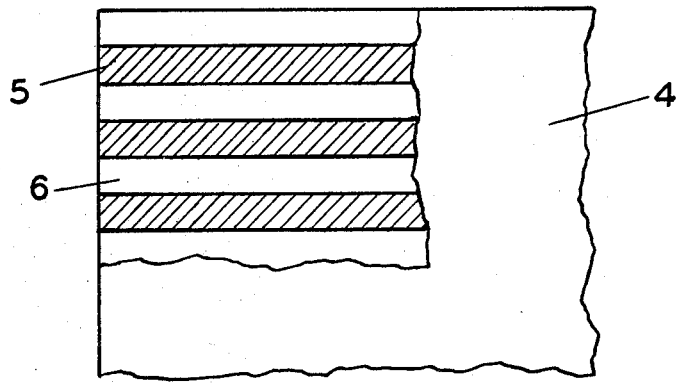
FIG. 2 is a greatly enlarged fractional view of an analytical screen showing alternate penetrating ray transparent and ray absorbent lines.

FIG. 2 shows an exposed and developed radiographic analytic screen with alternate lines of respectively unequal permeability by penetrating radiation. To obtain this analytic screen, a pattern of alternate black and white stripes was photographed on ray sensitive photographic film and the film was developed. The numeral 4 indicates a support, the numeral 5 indicates silver bearing image lines, and 6 indicates the desilvered lines. The lines 5 and 6 will define soft tissue and hard substance respectively. The alternate silver and silverless lines 5 and 6 are parallel and of equal width, and occupy collectively equal areas, to define soft tissue and harder substance in equal proportions. The methods and mechanics involved are the same as described in connection with FIG. 1, only the analytic pattern is different.

Figure 3:
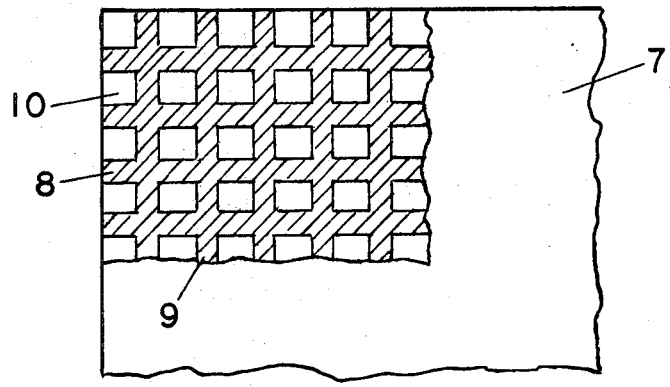
FIG. 3 is a greatly enlarged fractional view of an analytic screen showing alternate dots and lines of respectively unequal permeability to penetrating radiation. The dots may be silver and the lines relatively penetrating ray transparent, or vice versa.

In FIG. 3, the numeral 7 indicates a support, and the numerals 8 and 9 indicate two series of lines, one series intersecting the other and forming squares 10 between the lines. The squares and lines have respectively unequal permeability by penetrating rays; and the squares may be silver bearing and the lines be silverless or vice versa. The lines are half as wide as the squares, so that collectively the lines and squares occupy equal areas, to define soft tissue and harder substance in equal proportions. Here too, the methods and the mechanics involved are the same as described in connection with FIG. 1, only the pattern is different.

Any other suitable pattern may be used in this invention to result in radiographic analytic screens.

Intensifying screens may be used to make a stronger analytic image, and may be placed in any suitable position relative to the X-ray film and analytic screen; in front, in back or therebetween.

A single intensifying screen on the back side of an oppositely coated X-ray film is very effective. In this arrangement, the analytic screen is placed on the front surface of the sensitive X-ray film, in contact with the film. The analytic screen will alter the intensity pattern of the X-rays, to produce an analytic density pattern on the front emulsion of the oppositely coated film. By "X-rays" is meant any suitable form of penetrating radiation. The same altered X-ray pattern then exposes the rear surface emulsion of the X-ray film with the same intensity pattern, producing the same density pattern thereon as on the front emulsion; and then the same altered X-ray pattern will excite the phosphor in the intensifying screen which will expose the rear surface emulsion in the same analytic image with visible secondary light, producing a stronger analytic image on the rear surface of the X-ray film.

Therefore, the front emulsion of the oppositely coated X-ray film is exposed through the analytic screen by the penetrating rays only, and the back emulsion is exposed in the same analytic pattern by the penetrating rays and by the secondary light from the intensifying screen.

Of course, all 3 image renditions are in register, and the result is a radiographic analytic image in which all density ranges are defined.

The analytic screen may also form the support for a fluorescent compound and form part of an analytic intensifying screen, or may be incorporated in an intensifying screen in any manner.

It is part of this invention to spread a fluorescent compound on such an analytic screen or over an interposed carrier layer to form a fluorescent analytic dot screen.

The analytic screen may also be attached or bonded to an intensifying screen, or may be partly or entirely imbedded in the intensifying compound.

All these modifications form part of this invention.

This invention includes any radiographic screen having a regular pattern of alternate penetrating ray transparent and ray absorbent areas of equal size disposed side by side without superposition.

The principles involved in this invention may be applied to all fields of radiography and photography.

In the claims, by "area" is also meant line, dot, square, or any figure; by "silver" is also meant any other suitable material; by "silver-bearing" is also meant ray absorbent; by "silverless" is also meant ray transparent; by "emulsion" is also meant fluorescent material.

Also in the claims, by "all object areas being defined in the resulting radiograph with definition of detail in hard substance and in relatively soft substance" is also meant "the analytic pattern improving the definition of detail of both hard and soft substance"; by "radiographic" is also meant fluoroscopic.

I claim:

1. In a radiographic method comprising transmitting penetrating rays from a suitable source through an object to photographic film, the improvement consisting in passing the penetrating rays through a screen with alternate silver-bearing and silverless areas to change the ray image to an analytic intensity pattern, the silverless areas permitting the penetrating rays to pass through easily for primarily defining hard substance on the emulsion directly behind these silverless areas, but the silverbearing areas reducing the intensities of the penetrating rays passing therethrough for primarily defining relatively soft substance on the emulsion directly behind the silverbearing areas, all object areas being defined in the resulting radiograph with definition of detail in hard substance and in relatively soft substance.

2. In a method according to claim 1, the improvement consisting in passing the penetrating rays through a screen with alternate silverbearing and silverless areas of equal size.

3. In a method according to claim 1, the improvement consisting in passing the penetrating rays through a screen with alternate silverbearing and silverless areas of collectively equal sizes.

References Cited

UNITED STATES PATENTS

| 2,344,823 | 3/1944 | Landis et al. | 250—65 |
| 2,344,824 | 3/1944 | Landis et al. | 250—65 |

OTHER REFERENCES

A Method of Designing and Making Contact Screens, Dorst, pp. 55 to 60, 1951, Lithographic Technical Foundation, Inc., New York, N.Y.

Halftone Processes, Lockrey, pp. 4–7 and 44–46, 1941, J. J. Tepper Corporation, New York, N.Y.

RALPH G. NILSON, Primary Examiner

A. L. BIRCH, Assistant Examiner